Nov. 28, 1961  H. M. HEUVER ET AL  3,010,652
DIRECT VISUAL READOUT COUNTER
Filed Dec. 13, 1957  4 Sheets-Sheet 1

INVENTORS.
HERBERT M. HEUVER
JOHN B. D'ANDREA
BY
Wade Koontz
ATTORNEY
Arthur R. Parker
AGENT

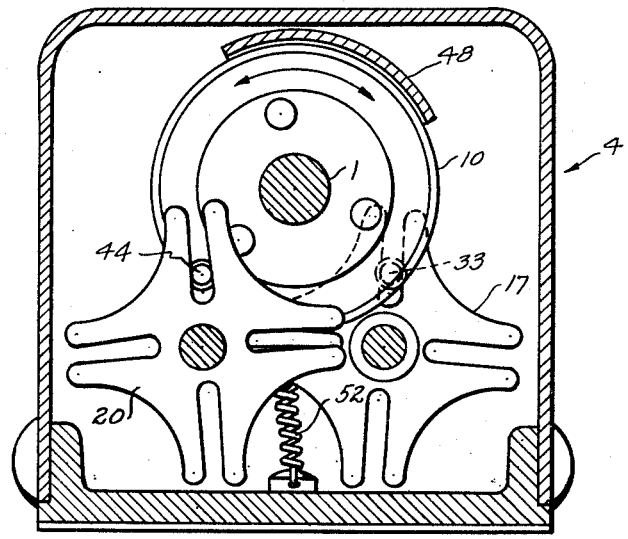
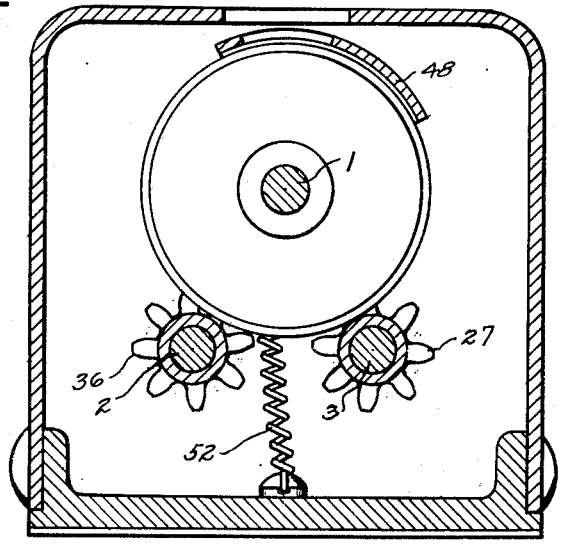

Nov. 28, 1961   H. M. HEUVER ET AL   3,010,652
DIRECT VISUAL READOUT COUNTER

Filed Dec. 13, 1957                                         4 Sheets-Sheet 3

INVENTORS.
HERBERT M. HEUVER
JOHN B. D'ANDREA
BY
Wade Loonty
ATTORNEY
Arthur R. Parker
AGENT

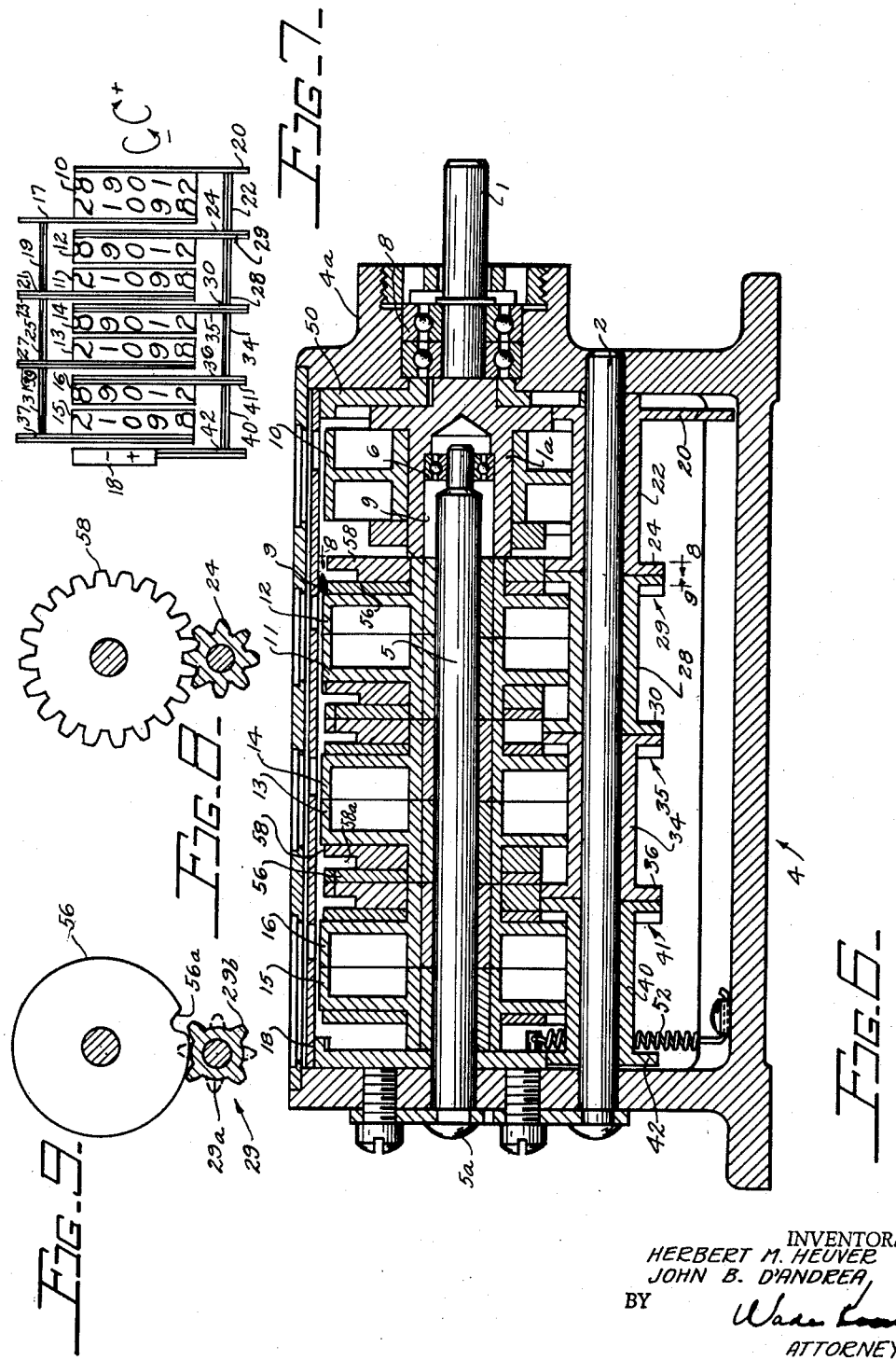

United States Patent Office 3,010,652
Patented Nov. 28, 1961

3,010,652
DIRECT VISUAL READOUT COUNTER
Herbert M. Heuver and John B. D'Andrea, Dayton, Ohio; said Heuver assignor by decree of distribution to Robert G. Heuver
Filed Dec. 13, 1957, Ser. No. 702,738
5 Claims. (Cl. 235—117)
(Granted under Title 35, U.S. Code (1952), sec. 266)

The invention described herein may be manufactured and used by or for the United States Government for governmental purposes without payment to us of any royalty thereon.

This invention relates generally to an indicating device for digital counting systems and, more particularly, to the correct disposition of both positive and negative numbers indicating the number of complete or partial revolutions of a shaft.

In the case of digital counters for wind tunnel computing scales for the indication of forces, moments, angles and displacements, airplane model attitude indicating equipment, various types of navigational instruments, directional indicators, and various other computers and indicators, as for example, the analogue-to-digital converter, gun-laying and antenna-directing devices, and bomb-sights, it has been determined that the use of a single counter having a double set of numbers reading in the positive and negative directions gives an incorrect reading by losing one digit when passing through the "zero" in the negative direction. Moreover, when using one ordinary counter, it is necessary to read the number on the counter and then subtract from the maximum possible number designed in the counter in order to obtain the actual negative reading. Such a procedure is, of course, extremely time-consuming where a large number of separate readings are required. It is naturally extremely important that the obvious disadvantage of this procedure be substantially eliminated as has been accomplished in the present invention.

It is an object of the present invention, therefore, to provide an indicating device for digital counting systems in which both positive and negative numbers are read directly.

It is a further object of the invention to utilize a direct visual readout counter in which the number of shaft revolutions in a negative direction is read correctly without the loss of a digit when passing through "zero."

A still further object of the invention resides in a direct visual readout counter utilizing plus and minus counters in a unique and improved manner to visually indicate the correct number of shaft revolutions in either plus or minus direction.

Another object of the invention provides an indicating device having positive and negative counter assemblies automatically repositioning the readings thereon to "zero" when the maximum count has been reached.

Other objects and advantages of the invention will become apparent from the following description, taken in connection with the accompanying drawings, in which like reference characters refer to like parts in the several figures:

FIG. 2 is a cross-sectional view taken about on section 2—2 of FIG. 1, illustrating the relationship of the oppositely disposed Geneva wheels utilized for transferring initial movement of the counter drive shaft to adjacent digit wheels.

FIG. 3 is a second cross-sectional view taken about on section 3—3 of FIG. 1, illustrating the transfer pinions utilized to transfer further movement of the counter drive shaft.

FIG. 6 is a longitudinal sectional view taken about on section 6—6 of FIG. 5, illustrating details of the assembled plus-minus counter digit wheels and transfer spool assemblies utilized in the invention.

FIG. 7 is a schematic view of the counter utilized in the invention, illustrating the overall operation of the plus and minus assemblies.

FIG. 8 is a fourth cross-sectional view taken about on section 8—8 of FIG. 6, illustrating the engagement between the transfer pinion of the invention and one of the 20-tooth gears utilized therewith.

FIG. 9 is another cross-sectional view taken about on section 9—9 of FIG. 6, illustrating additional details of the transfer mechanism of the invention.

Figure 5:
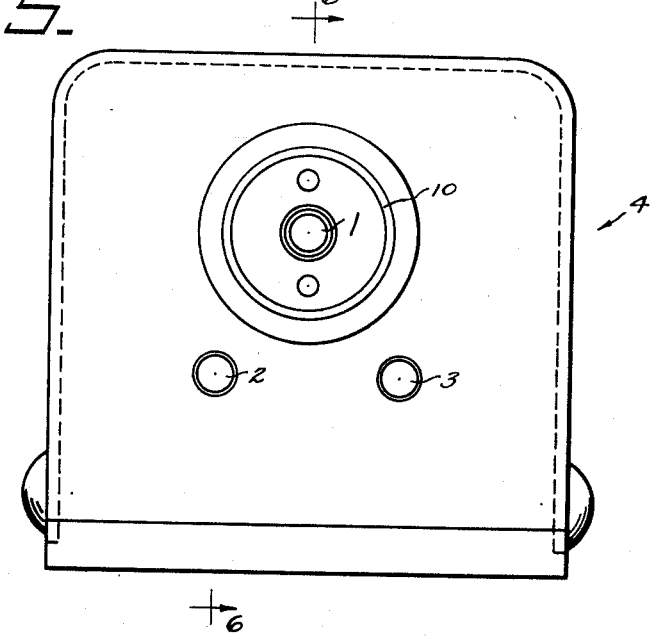
FIG. 5 is a front end view of the assembled counter of FIG. 1, illustrating the relationship between the main drive shaft and the plus and minus counter shafts.

Referring particularly to FIG. 6 of the drawings, the digital counter of the subject invention is encased in a housing indicated generally at 4 and having a forward projecting portion 4a in which projecting portion 4a a relatively short main drive shaft 1 is mounted by means of the double bearing indicated at 8. Said drive shaft 1 incorporates an enlarged rear portion 1a on which is fixedly mounted the common digit wheel 10. In addition, said enlarged rear portion 1a incorporates a relatively enlarged opening indicated generally at 9 which opening 9 mounts the forward end of the relatively elongated bearing shaft 5 by means of the single bearing indicated at 6 which bearing shaft 5 is rigidly affixed at its rear end to housing 4 as at 5a. A plurality of digit wheels 11–16, inclusive (to be described hereinafter), are rotatably positioned in spaced relation on shaft 5. Since said digit wheels are mounted on a single shaft 5, the latter is referred to as a common shaft and since main drive shaft 1 drives all of said digit wheels it, too, is referred to as a common shaft. Lastly, digit wheel 10 is common to both the plus and minus counters since it is driven by common drive shaft 1 to drive the remaining digit wheels 11–16, inclusive. Said plus counter, then, consists of digit wheels 10, 12, 14 and 16 and in addition thereto the plus-minus assembly 18 and transfer spool assemblies 22, 28, 34 and 40 together with the auxiliary bearing or motion transfer shaft 2 and common shafts 1 and 5. Said minus counter (only part of which is illustrated in FIG. 6 for the sake of clarity) is identical in construction to the plus counter and is shown schematically in FIG. 7 as consisting of digit wheels 10, 11, 13 and 15, and transfer spool assemblies 19, 25 and 31 together with the auxiliary bearing or motion transfer shaft 3 and common shafts 1 and 5. Said shafts 2 and 3, respectively, rotatably mount the plus counter transfer spool assemblies 22, 28, 34 and 40, and the minus counter transfer spool assemblies 19, 25 and 31. In addition, shafts 2 and 3 are rigidly mounted in housing 4 parallel to each other in a horizontal plane below and to the left and right, respectively, of a vertical plane through the center of common shaft 1 as seen clearly in FIG. 5 of the drawings, for example. It is now noted that on rotation of common digit wheel 10 by common drive shaft 1 both sets of plus and minus digit wheels are rotated by their respective transfer spool assemblies by means to be explained hereinafter in detail. Each of said digit wheels 11–6, inclusive, incorporates a single step keeper wheel 56 and a full toothed gear 58 riveted together as one unit and riveted to the rear face of a respective digit wheel. Said single step keeper wheel 56 and full toothed gear 58 engage with their respective transfer spool assemblies at the appropriate phase of counter operation to transmit motion therethrough from one set of digit wheels to an adjacent set of digit wheels. In this manner, motion transmitted to transfer spool assemblies 19 and 22 from Geneva wheels 17 and 20, respectively (see FIG. 2 of the drawings), is transferred to the first set of digit wheels 11 and 12 of the minus and plus counters, respectively, after each revolution of common digit wheel 10. Said motion amounts to one-tenth of a revolution or one digit movement in said digit wheels 11 and 12 for each revolution of common digit wheel 10. No motion is imparted through transfer spool assemblies 19 and 22 to digit wheels 11 and 12 through keeper wheel 56 and full toothed gear 58 mounted thereon until a complete revolution has been accomplished with common digit wheel 10. Said transfer spool assemblies 19 and 22 incorporate the previously mentioned Geneva wheels 17 and 20, respectively, as one flange and a transfer pinion 21 and 24, respectively, as the other flange. Transfer spool assemblies 25 and 28 incorporate a conventional mutilated pinion 23 and 29, respectively, as one flange and a transfer pinion 27 and 30, respectively, as the other flange. Transfer spool assemblies 31 and 34 also incorporate a conventional mutilated pinion 39 and 35, respectively, as one flange and a transfer pinion 37 and 36, respectively, as the other flange. Transfer spool assembly 40 incorporates a conventional mutilated pinion 41 as one flange and a transfer pinion 42 as the other flange. It is noted that the construction of said mutilated pinions will be described hereinafter in detail with specific references to FIG. 9 of the drawings.

With particular reference to FIG. 2 of the drawings, it is clearly seen that common digit wheel 10 incorporates a pair of driving pins 33 and 44 spaced apart and mounted on opposite sides adjacent the circumference thereof. Driving pin 44 constitutes the driving means for the plus counter since it engages as shown with Geneva wheel 20 which Geneva wheel 20 constitutes one flange of transfer spool assembly 22 as previously explained. Driving pin 33 constitutes the driving means for the minus counter since it engages as shown with Geneva wheel 17 which Geneva wheel 17 constitutes one flange of transfer spool assembly 19 as previously explained. It is obvious, therefore, that rotation of the common wheel 10 effects simultaneous rotation of transfer spool assemblies 19 and 22 through their respective driving pins and Geneva wheel connection indicated at 33 and 17 and 44 and 20, respectively. Said simultaneous rotation by common wheel 10 effects alternate rotation of transfer spool assemblies 25 and 28, 31 and 34 and 40 in a manner previously described with specific reference to FIG. 6 of the drawings.

Figure 1:
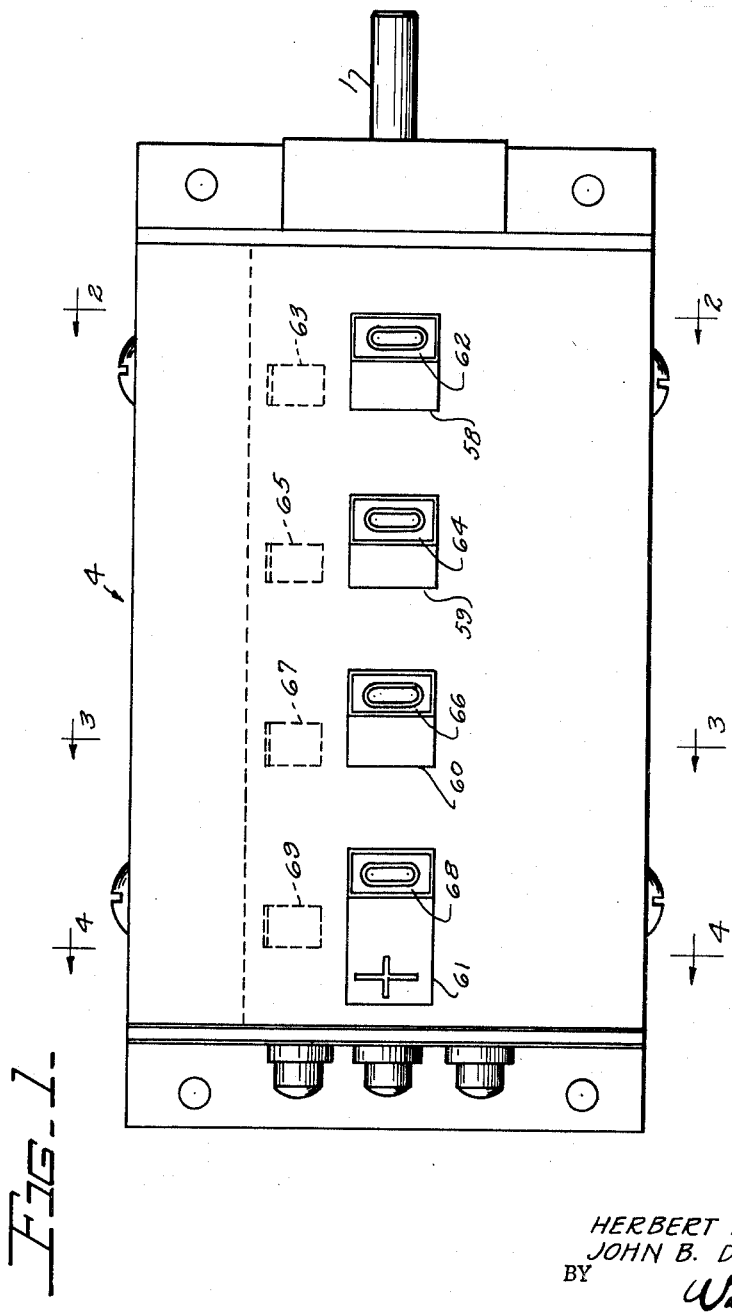
FIG. 1 is a top view of the assembled counter utilized in the invention, illustrating the "zero" position thereof with the plus-minus assembly in the plus position.
Figure 4:
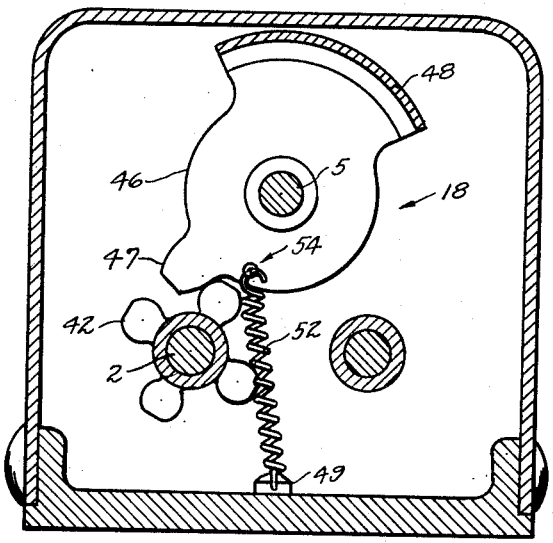
FIG. 4 is a third cross-sectional view taken about on section 4—4 of FIG. 1, illustrating the arrangement between the plus-minus assembly and the shutter utilized therewith.

As seen clearly in FIGS. 1 and 4 of the drawings, an important feature of the inventive counter is illustrated. The previously described transfer spool assembly 40 is utilized for actuating the plus-minus assembly 18 on the positive or plus counter. Said plus-minus assembly 18 consists of a disc 46, cylindrical shutter 48, shutter support 50 (note, FIG. 6) and a spring 52. Disc 46 is rotatably mounted on common shaft 5 and incorporates a single tooth 47 for engagement with the transfer pinion 42 of transfer spool assembly 40. It is noted that said transfer pinion 42 has only four teeth which is one-half the number of teeth as have the other transfer pinions, as for example, those noted at 27 and 36 in FIG. 3 of the drawings which have eight teeth. The four-tooth pinion 42 has been determined appropriate relative to the single tooth 47 of disc 46 for coaction therewith when the count is changed from plus to negative. Cylindrical shutter 48 is mounted on or integral with said disc 46 and said shutter support 50. Spring 52 is attached between an opening in disc 46 as indicated at 54 and the base of the housing 4 as indicated at 49. Shutter 48 is a cylindrical segment incorporating a plurality of realtively small windows 62, 64, 66 and 68 viewable through a plurality of relatively large windows 58, 59, 60 and 61 incorporated in housing 4 as seen clearly in FIG. 1 of the drawings. In addition, said shutter 48 incorporates a plurality of relatively small window openings 63, 65, 67 and 69 disposed radially and offset from openings 62, 64, 66 and 68.

Referring now specifically to FIG. 7 of the drawings, a schematic showing is made of the overall arrangement of the various digit wheels and their operation in either plus or minus direction. Common wheel 10 fixedly mounted on common shaft 1 includes one row of digits reading from zero to nine for the positive numbers on the "R" side thereof and a second row of digits reading in reverse for the negative numbers on the "L" side thereof. Said two rows of digits "R" and "L" are arranged in opposite consecutive order around the cylindrical surface of said wheel 10 starting with zero at the same point. The additional digit wheels 11, 13 and 15 for the minus or negative counter and 12, 14 and 16 for the plus or positive counter are arranged alternately along common shaft 5 with each of the plus counter wheels 12, 14 and 16 having a row of digits arranged around the cylindrical surface identical to the "R" side of common wheel 10 and each of the minus counter wheels 11, 13 and 15 having a row of digits arranged in opposite consecutive order identical to the "L" side of common wheel 10. The relatively small window openings 62, 64, 66 and 68 as seen clearly in FIG. 1 of the drawings are spaced along an element of cylindrical shutter 48 at stations directly above the plus digit wheels 10R, 12, 14 and 16 and are labeled by means of a plus (+) sign at the left end of the shutter, whereas the relatively small shutter openings 63, 65, 67 and 69 are disposed radially and offset from said first-mentioned window openings 62, 64, 66 and 68 along another cylindrical element at stations directly above the negative digit wheels 10L, 11, 13 and 15 and labeled by means of a minus (—) sign at the left end of said shutter 48. The single tooth 47 of disc 46 is so placed thereon that the relatively small window openings 62, 64, 66 and 68 of shutter 48 and the plus (+) sign are viewable or exposed through the relatively large window openings 58, 59, 60 and 61 of housing 4 when the plus (+) counter reads from 0000 to 9999, whereas the relatively small shutter openings 63, 65, 67 and 69 and the minus (—) sign are viewable or exposed through the same housing openings 58–61, inclusive, when the negative or minus (—) counter reads from 0001 to 9999. The above characteristic is effected by the position of said single tooth 47 relative to the four-tooth transfer pinion 42 which transfer pinion 42 normally retains disc 46 and hence shutter 48 in the positive or plus position; however, when movement is effected in the minus direction transfer pinion 42 rotates one-fourth of a revolution to disengage from said single tooth 47 to permit rotation of the latter in the negative direction and thus bring into view the relatively small openings 63, 65, 67 and 69 and the minus (—) sign.

An important feature of transfer pinion 42 described above resides in its operation when more counts than the maximum of 9999 are attempted to be put into the plus counter in which event the capacity thereof has been exceeded. In that situation, transfer pinion 42 advances one-fourth turn rotating disc 46 in the plus direction until transfer pinion 42 has cleared the tooth 47 at which point, the spring 52 returns the disc 46 to its original plus position in contact with the next tooth of transfer pinion 42. This one-fourth turn advancement of transfer pinion 42 is effected at this point, since all of the transfer and mutilated pinions of the various transfer spool assemblies are in engagement with the appropriate single step keeper wheel 56 on the respective digit wheels 11—16 and the addition of one more digit in the positive direction rotates all of said digit wheels simultaneously to their zero position.

With particular reference to FIGS. 8 and 9 of the drawings, description is now made of the specific transfer mechanism utilized with the present invention and the operation thereof to transfer motion of counter shaft 1 between successive digit wheels. It is noted that specific reference is hereinafter made only to the first two transfer points, since the remaining transfer assemblies and points are identical thereto. As seen clearly in FIG. 8 of the drawings, transfer pinion 24 consists of an 8-toothed gear which gear 24 is engaged with a 20-toothed gear 58. Said gear 58 is riveted to the single step keeper wheel 56 which wheel 56 incorporates a single tooth 56a on its periphery for a purpose to be hereinafter explained. The peripheries of both keeper wheel 56 and gear 58 are is spaced relation relative to one another due to a circumferential cutaway portion 58a incorporated in said gear 58. Moreover, both keeper wheel 56 and gear 58 are riveted to the digit wheel 12 as seen in FIG. 6 of the drawings. Furthermore, single step keeper wheel 56 is in periodic engagement with the mutilated pinion 29 incorporated as one flange of the next adjacent transfer spool assembly 28. Said mutilated pinion 29 consists of an 8-toothed part 29a and a 4-toothed part 29b. Said 8-toothed part 29a normally rides in said circumferential cutaway portion 58a between the respective peripheries of keeper wheel 56 and gear 58 whereas, 4-toothed part 29b normally rides on the periphery of the keeper wheel 56. It is seen therefore from FIG. 2 of the drawings that rotation of counter shaft 1 in the plus or positive direction initially rotates common digit wheel 10 with each one-tenth of a revolution thereof being directly exposed to view through window and casing openings 58 and 62, respectively, until the digit "9" is exposed, at which point the driving pin 44 begins to enter one of the slotted surfaces of Geneva wheel 20. On further rotation of common digit wheel 10 to complete a revolution and return the count thereon to "zero," said driving pin 44 rotates Geneva wheel 20 one-fourth of a turn and since the latter is actually one flange of the first transfer spool assembly 22, transfer pinion 24 is likewise rotated one-fourth of a turn. A one-fourth of a turn rotation of said transfer pinion 24 results in rotation or advancement of two of its eight teeth which, in turn, rotates or advances gear 58 (note FIG. 8) two teeth. Since gear 58 has a total of twenty teeth, a 2-tooth rotation thereof by transfer pinion 24 results in a one-tenth of a revolution. The single step keeper wheel 56 (note FIG. 9) which is riveted to gear 58 and the digit wheel 12 riveted thereto are both simultaneously rotated one-tenth of a revolution so that the digit "1" is directly exposed to view through window and casing openings 59 and 64, respectively. At this point, a "zero" is exposed on common digit wheel 10 and a "1" is exposed on digit wheel 12. The above described operation is continued on further rotation of shaft 1 until a "99" appears respectively on digit wheels 12 and 10 at which time, the single step 56a of single step keeper wheel 56 is about to engage with one of the teeth of the 4-toothed part 29b of mutilated pinion 29 and 4-toothed part 29b has been riding on the periphery of keeper wheel 56. With the rotation of one additional one-tenth of a revolution, said step 56a engages with and advances said 4-toothed part 29b one-fourth of a turn. Since mutilated pinion 29 is actually one flange of the next adjacent transfer spool assembly 28 the latter is likewise advanced or rotated one-fourth of a turn to rotate the next digit wheel 14 one-tenth of a revolution in the same manner as previously described for digit wheel 12. The remaining plus digit wheel 16, as well as the minus digit wheels 11, 13 and 15 when reading in the negative direction are also advanced periodically until a maximum reading of "9999" is obtained in a manner and with structure identical to that already described and for that reason are not explained in detail.

Thus, an improved and unique digital counter has been developed by the present invention whereby a direct visual reading of the revolution count of the counter shaft has been developed. Moreover, a counter mechanism involving a simple and yet novel arrangement has been presented in the subject invention wherein an accurate count of counter shaft revolution is determined automatically and directly presented visually with no lost digits and with the possibility of reading complementary numbers obviated.

We claim:

1. A direct visual readout counter for computer mechanisms, comprising, a main housing having a forward projecting portion, a relatively short common drive shaft rotatably positioned in said forward projecting portion and having an enlarged rear portion with a relatively large rear opening therein, a common digit wheel having a double set of left and right digits on the surface thereof numbered from zero to nine in opposite consecutive order fixedly mounted on the circumference of said enlarged rear portion and including a pair of interconnecting, oppositely disposed drive means positioned thereon, a relatively elongated common main bearing shaft fixedly mounted at one end to said housing and at the other end rotatably mounted in said relatively large rear opening of said drive shaft, a plurality of plus and minus counter digit wheels rotatably mounted in spaced relation in alternate plus-minus pairs on said common main bearing shaft and having digits on the surface thereof numbered from zero to nine in opposite consecutive order, a first auxiliary bearing shaft positioned in said housing and spaced from said main bearing shaft on one side of a centerline through said common digit wheel, a second auxiliary bearing shaft positioned in said housing and spaced from said first auxiliary bearing shaft on the opposite side of said common digit wheel centerline, a first plus transfer spool assembly mounted on said first auxiliary bearing shaft between one of the pair of drive means positioned on said common digit wheel and one of said first pair of digit wheels, a first minus transfer spool assembly mounted on said second auxiliary bearing shaft between the other of the pair of drive means positioned on said common digit wheel and the other of said first pair of digit wheels, said plus and minus transfer spool assemblies each having a Geneva wheel as one flange thereof in periodic engagement with a selected one of the pair of drive means of said common digit wheel for a one-digit movement thereof on completion of each revolution of said common digit wheel and a transfer pinion having a predetermined number of teeth as a second flange thereof in periodic engagement with the respective digit wheel of said first pair of digit wheels for periodic, one digit movement thereof in opposite consecutive order on completion of each revolution of said common digit wheel, a plurality of additional transfer spool assemblies mounted on each of said first and second auxiliary bearing shafts in spaced relation thereto and adjacent said first transfer spool assembly having a mutilated pinion adjacent the transfer pinion of each adjacent transfer spool assemblies and a transfer pinion in operable engagement with the respective digit wheel of succeeding pairs of digit wheels successively transferring periodic one digit motion to succeeding pairs of digit wheels on completion of each revolution of successively preceding pairs of digit wheels, and a plus-minus assembly rotatably mounted on said main bearing shaft at its end remote from said common digit wheel between a plus and a minus position visually indicating a plus or a minus reading depending on its position, said plus-minus assembly being in periodic engagement with the last of said transfer spool assemblies mounted on a selected one of said auxiliary bearing shafts to alternately move said plus-minus assembly between plus or minus position, said plus-minus assembly comprising a single tooth disk mounted on said main bearing shaft pivotal between the plus and minus position, a cylindrical shutter mounted on said disk, a support for said shutter and a spring between said disk and said housing urging said disk toward its minus position, and means normally retaining said disk and the shutter carried thereon in its plus position, said means comprising a transfer spool assembly arranged for operation by the last plus digit wheel and having a transfer pinion having teeth of a number less than the predetermined number of teeth of said other transfer spool assemblies for actuating said plus-minus assembly, said transfer spool assembly comprising a mutilated pinion in periodic engagement with the last of said additional transfer assemblies mounted on said first auxiliary bearing shaft, said transfer pinion in engagement with the single tooth of said disk normally retaining said disk in its plus position and disengaging from said single tooth rotating said disk to its minus position under urging of said spring, said last-named transfer pinion further advancing an additional one fourth turn rotating said disk in a plus direction one more digit until said last-named transfer pinion as cleared the single tooth of said disk subsequent to the plus count reaching its maximum value to effect simultaneous rotation of all of said digit wheels to the zero position.

2. A direct visual readout counter for computer mechanisms as in claim 1, and gear means affixed to each of said digit wheels in continuous engagement with said transfer pinions and periodic engagement with said mutilated pinions to transfer periodic movement between adjacently mounted digit wheels.

3. A direct visual readout counter as in claim 1, each of said digit wheels having a single step keeper wheel affixed thereto in periodic engagement with a respective mutilated pinion on an adjacently positioned transfer spool assembly, and a full toothed gear affixed to said single step keeper wheel in engagement with a transfer pinion positioned on an appropriate transfer spool assembly for transferring digital movement to said mutilated pinion.

4. A direct visual readout counter comprising a main casing having a plurality of circumferential openings, a main bearing shaft longitudinally affixed therein, a plurality of plus and minus digit wheels rotatably positioned on said main bearing shaft in alternate, spaced relation thereon, a main drive shaft bearing mounted in and extending in overlapping relation relative to one end of said casing adjacent one end of said main bearing shaft and incorporating a main digit wheel circumferentially affixed relative thereto for rotation therewith in either plus or minus direction, interconnecting drive means between said main digit wheel and the first pair of each of said plurality of plus and minus digit wheels for alternately operating said plus and minus digit wheels to record the count on operation of said main drive shaft in either direction said interconnecting drive means comprising a plurality of plus and minus counter transfer spool assemblies, respectively, positioned adjacent said plurality of plus and minus digit wheels, the plus and minus counter transfer spool assemblies positioned immediately adjacent said main digit wheel each incorporating a Geneva wheel on one end thereof in driving engagement with said main digit wheel and a transfer pinion on the other end thereof and the remaining plus and minus transfer spool assemblies each incorporating a mutilated pinion at one end thereof positioned adjacent a transfer pinion of an adjacent spool assembly and a transfer pinion at the other end thereof, each of said plus and minus digit wheels having a full-toothed gear in continuous engagement with the transfer pinion of a preceding transfer spool assembly affixed to the rear face thereof and a single-step keeper wheel combined therewith and having a periphery in spaced relation to that of said full-toothed gear and in periodic engagement with the mutilated gear of the next adjacent transfer spool assembly for advancing the next adjacent wheel one digit for each complete revolution of each preceding transfer spool assembly, the spaced relation between the peripheries of said full-toothed gear and said single-step keeper wheel normally dividing the space for one part of said mutilated pinion, and a plus-minus assembly positioned on said main bearing shaft remote from said main digit wheel for rotation between one of two positions, said plus-minus assembly having a cylindrical shutter element incorporating a double row of windows on the circumference thereof corresponding, respectively, to the plus or minus count, and motion transferring means between the last of said plus digit wheels positioned on said main bearing shaft remote from said main digit wheel and said shutter element, said motion transferring means comprising a transfer spool assembly rotatably mounted in said main casing parallel to and adjacent said main bearing shaft and adjacent the plus digit counter wheel remote from said counter shaft, a periodic single step element affixed to said last-named wheel, a mutilated pinion integrally mounted on one end of said transfer spool assembly in periodic engagement with said single step element, a transfer pinion integrally mounted on the other end of said transfer assembly, and a rotatably mounted disc on said main bearing shaft at the end thereof remote from said counter shaft supporting said cylindrical shutter element and having a single tooth in engagement with said transfer pinion to rotate said shutter element on predetermined movement of said last-named wheel to alternately expose to view through said casing opening one or the other of said double row of windows, said disk being rotated until said single tooth has cleared its engagement with the teeth of said transfer pinion on rotation of said transfer pinion one more digit in the plus direction simultaneous with one more revolution of said main drive shaft after the maximum count permissible has been reached to simultaneously rotate all of said digit wheels to the zero position.

5. A direct visual readout counter comprising an outer casing having a bearing portion projecting outwardly from one end thereof, a main drive shaft rotatably positioned within said projecting bearing portion and having an outer end projecting outwardly therefrom and an inner end projecting inwardly thereof and terminating in an enlarged inner portion incorporating a relatively enlarged opening therein, a main bearing shaft non-rotatably supported within said outer casing inwardly of and in actual alignment with said main drive shaft and bearing mounted at one end thereof within the relatively enlarged opening of said enlarged inner portion, a plus counter mechanism positioned within said outer casing comprising a first plurailty of plus counter digit wheels rotatably positioned in spaced relation on said main bearing shaft, a plus counter transfer spool assembly for periodically transferring motion between each adjacently mounted pair of said first plurality of plus counter digit wheels and a first motion transfer, an auxiliary bearing shaft rigidly mounted within said housing in spaced, parallel relation to said main bearing shaft, a minus counter mechanism comprising a second plurality of minus counter digit wheels rotatably positioned in alternate, spaced relation to said first plurality of plus counter digit wheels on said main bearing shaft, a minus counter transfer spool assembly for periodically transferring motion between each adjacently mounted pair of said second plurality of minus counter digit wheels and a second motion transfer, auxiliary bearing shaft rigidly mounted within said housing in spaced, parallel relation to said first motion transfer shaft, motion transfer means between each of said plus and minus counter shafts and a respective, adjacently mounted pair of each of said plurality of plus and minus counter digit wheels, said motion transfer means comprising a combined, single step transfer device rigidly positioned on the rear face of each of said plurality of plus and minus counter digit wheels and a transfer pinion arranged as one flange of a respective transfer spool assembly for progressively transferring a one digit movement therethrough on each revolution of a corresponding transfer spool assembly, a common digit wheel rigidly positioned in surrounding relation on the enlarged inner portion of said main drive shaft for rotation therewith, and drive means interconnected between said common digit wheel and the first pair of said plus and minus transfer spool assemblies comprising a Geneva wheel formed as one flange of each of said plus and minus transfer spool assemblies and in periodic, driving engagement with said common digit wheel for rotation of said transfer spool assemblies on operation of said main drive shaft, the transfer pinion incorporated as one flange of the plus transfer spool assembly transferring motion to the last one of said plurality of plus digit wheels being in driving engagement with a plus-minus assembly located within said housing remote from said projecting bearing portion and including a disk rotatably positioned on said main bearing shaft in adjacent relation to the transfer spool assembly positioned on said plus counter shaft remote from said common digit wheel, said disk incorporating a single tooth in periodic engagement with the transfer pinion formed as one flange of said last-named spool assembly and a cylindrical shutter element integrally formed with said disk and incorporating a first plurality of relatively small window openings spaced therealong directly above said plus counter digit wheels and in alignment with a pluatively large window openings formed in the circumference of said housing and a second plurality of relatively small window openings disposed in radial and offset relation to said first plurality of relatively small window openings directly above said minus counter digit wheels, the transfer pinion of said last-named spool assembly having a predetermined number of teeth respectively in engagement with the single tooth of said rotatably mounted disk in accordance with the position of said spool assembly to normally retain said disk and said shutter elements in the plus position to expose the plurality of plus counter digit wheels to view through the alignment of said first plurality of relatively small window openings and the relatively large window openings in said casing when the plus counter reads from 0000 to 9999 and to subsequently rotate one fourth of a turn to disengage from said single tooth on rotation of said disk and shutter in the minus direction to expose the plurality of minus counter digit wheels to view through said second plurality of relatively small openings when the minus counter reads from 0001 to 9999, said last-named transfer pinion initially rotating said disk in the plus direction until said single tooth has disengaged from said transfer pinion to effect subsequent return of said disk to its original position in contact with the next adjacent tooth on said transfer pinion, said plurality of transfer spool assemblies being simultaneously rotated to an engaged position with each of said combined single-step transfer devices rigidly positioned on the rear face of said plurality of digit wheels to automatically and simultaneously return all of said plus counter digit wheels to their zero position on the addition of one more digit in the positive direction simultaneous with rotation of said transfer pinion one more digit in the positive direction after the maximum count has been attained.

References Cited in the file of this patent

UNITED STATES PATENTS

| | | |
|---|---|---|
| 2,137,013 | Bradley | Nov. 15, 1938 |
| 2,285,844 | Spaunburg | June 9, 1942 |
| 2,550,103 | White | Apr. 24, 1951 |
| 2,682,373 | Opocensky et al. | June 29, 1954 |
| 2,813,679 | Heston | Nov. 19, 1957 |
| 2,851,215 | Bliss et al. | Sept. 9, 1958 |

FOREIGN PATENTS

| | | |
|---|---|---|
| 29,422 | Great Britain | Dec. 31, 1904 |

UNITED STATES PATENT OFFICE
CERTIFICATE OF CORRECTION

Patent No. 3,010,652                                         November 28, 1961

Herbert M. Heuver et al.

It is hereby certified that error appears in the above numbered patent requiring correction and that the said Letters Patent should read as corrected below.

Column 1, line 19, for "case" read -- use --; column 2, line 70, for "11-6" read -- 11-16 --; column 3, line 33, for "references" read -- reference --; column 4, line 2, for "real tively" read -- relatively --; column 5, line 17, for "is" read -- in --; column 7, line 24, for "as read -- has --; column 9, lines 32 and 33, for "pluatively" read -- plurality of relatively --.

Signed and sealed this 29th day of May 1962.

(SEAL)
Attest:

ERNEST W. SWIDER                                    DAVID L. LADD
Attesting Officer                                       Commissioner of Patents